T. H. ARNOLD.
Horse Hay-Fork.
No. 68,683.
Patented Sept. 10, 1867.
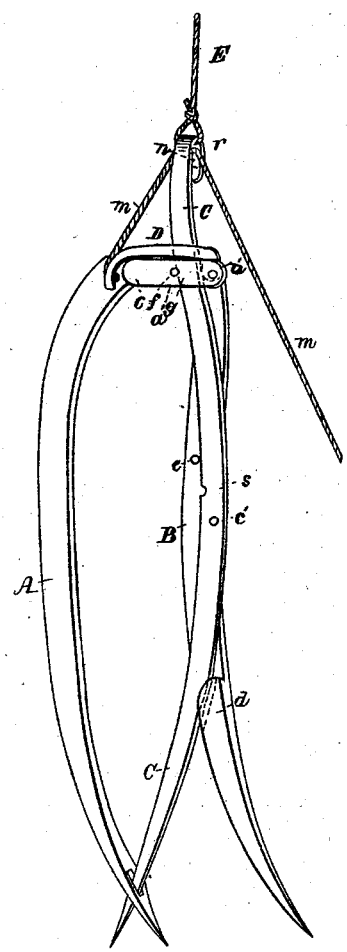
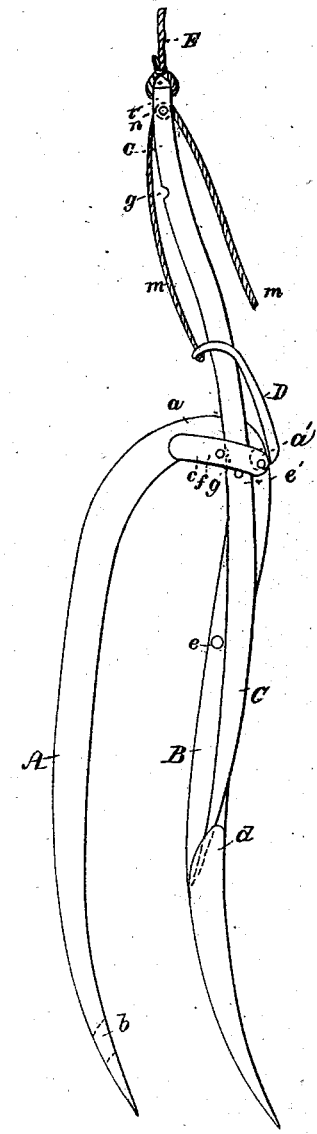
Witnesses:
Inventor:

United States Patent Office.

T. H. ARNOLD, OF TROY, PENNSYLVANIA.

Letters Patent No. 68,683, dated September 10, 1867.

---

IMPROVEMENT IN HORSE HAY-FORKS.

---

The Schedule referred to in these Letters Patent and making part of the same.

---

TO ALL WHOM IT MAY CONCERN:

Be it known that I, T. H. ARNOLD, of Troy, in the county of Bradford, and State of Pennsylvania, have invented certain new and useful Improvements in Hay-Elevators; and I do hereby declare that the following is a full, clear, and exact description of the same, reference being had to the accompanying drawings, making a portion of this specification, in which—

Figure 1 is a perspective view of a hay-elevator constructed according to my invention, showing the same in position for elevating the hay.

Figure 2 is a side view of the same in position for insertion into the hay.

Similar letters of reference indicate corresponding parts in both figures.

This invention consists in a sliding tine and a locking catch, in combination with two main tines, whereby a horse-fork or elevator is obtained which may be very easily inserted into the mass of hay to be elevated, which will very securely hold the said hay during the elevating operation, and which may be very readily operated to discharge the same therefrom when required.

The invention further consists in a novel means whereby the lower end of the sliding tine is effectually prevented from interfering in any way with the insertion of the fork in the hay; and furthermore, in a novel means whereby the upward movement of the sliding tine is limited, and whereby the said tine is retained in proper position, when the same is in place to open the apparatus.

To enable others to understand the construction and operation of my invention, I will proceed to describe it with reference to the drawings.

A and B represent two tines, which are made preferably of curved form, as shown in the drawings, and are united at the top, as shown at $a$. C shows a sliding tine, which is situated at one side of the tine B, and which is curved or inclined in a direction opposite to that of the curvature or inclination of the tines A B. The lower or pointed end of this tine C, when the apparatus is closed to lift the hay, is fitted into or passed through a slot or eye, $b$, formed in the tine A, near the lower extremity or point thereof, and has its upper end confined in place by a strap, $c$, attached to one side of the part $a$ of the tines A B, and the lower portion thereof works through a recess of suitable depth, formed within or under a guard, $d$, upon the corresponding side of the tine B, the said guard serving the twofold purpose of thus holding the sliding tine upon the tine B, and of preventing the said sliding tine from interfering with the insertion of the elevator or apparatus into the hay, as will be hereinafter fully set forth. It should be mentioned that a pin or stud, $e$, is so situated upon the tine B, at the inner edge of the sliding tine C, as to prevent the said tine from slipping inwards out of the recess, under the guard $d$. Formed at the inner end of the slot, under the strap $c$, through which the sliding tine is passed, as hereinbefore explained, is a stud, $f$, which, when the said tine is pushed downward to bring the apparatus to a closed position, fits into a notch formed in the inner edge of the aforesaid tine, as shown in dotted outline at $g$. A lever-catch, D, is pivoted at the outer end of the slot just mentioned, and, when turned inward over the strap $c$, a shoulder, $a'$, formed upon the said catch, fits against the outermost edge of the tine C, and thus firmly locks the same against the stud $f$. A tripping cord, $m$, extends from the extremity of this catch D, upward over a pulley, $n$, placed in a loop, $r$, in the upper end of the tine C, the opposite extremity of such tripping cord, when the apparatus is in use, being grasped by the hand of the person using the same. The draught-rope E is attached to the said loop, and is passed over pulleys in the usual manner.

In using the apparatus the sliding tine C is first drawn upward into the position shown in fig. 2, its upward movement being limited by the striking of a stud, $c'$, projecting from the flat outer side thereof, against the strap $c$, and the stud $f$ fitting into a small recess, $s$, formed in the inner edge of the aforesaid tine, so as to prevent the premature descent of the latter; the said tine being locked in this position, when desired, by bringing down the catch D, so that the shoulder $a'$ thereof will press the tine against the stud $f$. The tine C being in this position the two main tines A B are forced into the hay or other material to be lifted, the inclined surface of the guard $d$ preventing the point of the sliding tine from interfering with the passage of the tine B into the hay, and the sliding tine C is then forced downward until its pointed or lower end passes through the eye $b$ of the tine A, a quantity of the hay or material being thus enclosed or clasped between the tines A and C, the lower ends of the said tines passing under such quantity of hay or material. The catch D is then brought downward, into the position shown in the aforesaid fig. 1, to fasten or lock the tine C in place, as hereinbefore explained, and suitable power being applied to the draught-rope E, the elevator, and the hay grasped by the tines thereof, is elevated to the desired height, whereupon the tripping cord is pulled, which raises the catch D to unlock the sliding tine C, which being done the weight of the main tines, together with the load upon the apparatus, causes the said main tines to descend, or, in other words, enables the sliding tine to move upward relatively thereto into the position shown in fig. 2, and thus allow the hay or material to fall freely from the main tines A B.

What I claim as my invention, and desire to secure by Letters Patent, is—

1. The sliding tine C and locking catch D, in combination with the main tines A B, substantially as and for the purpose specified.

2. The guard $d$, in combination with the tines A B, and sliding tine C, substantially as and for the purpose herein set forth.

3. The recess $s$ and stud $c'$ of the sliding tine, arranged in relation with the strap $c$ and locking catch D, substantially as and for the purpose specified.

T. H. ARNOLD.

Witnesses:
　JAS. ADAMS,
　JOHN COWAN.